US012505601B2

(12) United States Patent
Kawashima et al.

(10) Patent No.: US 12,505,601 B2
(45) Date of Patent: Dec. 23, 2025

(54) CONTENT DISPLAY CONTROL DEVICE, CONTENT DISPLAY CONTROL METHOD, AND STORAGE MEDIUM STORING CONTENT DISPLAY CONTROL PROGRAM

(71) Applicant: DENSO CORPORATION, Kariya (JP)

(72) Inventors: Daiki Kawashima, Kariya (JP); Takuya Kondo, Kariya (JP); Kentaro Teshima, Kariya (JP)

(73) Assignee: DENSO CORPORATION, Kariya (JP)

( * ) Notice: Subject to any disclaimer, the term of this patent is extended or adjusted under 35 U.S.C. 154(b) by 210 days.

(21) Appl. No.: 18/450,779

(22) Filed: Aug. 16, 2023

(65) Prior Publication Data

US 2023/0394737 A1    Dec. 7, 2023

Related U.S. Application Data

(63) Continuation of application No. PCT/JP2022/003090, filed on Jan. 27, 2022.

(30) Foreign Application Priority Data

Feb. 22, 2021  (JP) ................................ 2021-026213

(51) Int. Cl.
*G06T 13/80* (2011.01)
*G06F 3/147* (2006.01)
*G06F 9/451* (2018.01)

(52) U.S. Cl.
CPC .............. *G06T 13/80* (2013.01); *G06F 3/147* (2013.01); *G06F 9/451* (2018.02)

(58) Field of Classification Search
CPC ......... G06T 13/80; G06T 13/00; G06F 3/147; G06F 9/451; G06F 3/1423; G06F 3/0484; G06F 3/1454
See application file for complete search history.

(56) References Cited

U.S. PATENT DOCUMENTS

| 2014/0250395 | A1* | 9/2014 | Tanaka | G06F 3/0482 715/765 |
| 2017/0052634 | A1* | 2/2017 | Reeves | H04W 48/18 |
| 2018/0046329 | A1* | 2/2018 | Yamanoi | G01J 3/0264 |
| 2020/0019284 | A1* | 1/2020 | Horiike | H04N 1/00411 |
| 2021/0097963 | A1  | 4/2021 | Kawashima et al. | |
| 2022/0179608 | A1  | 6/2022 | Kawashima et al. | |

FOREIGN PATENT DOCUMENTS

| JP | 2020003649 A | 1/2020 |
| WO | WO-2021029178 A1 | 2/2021 |

\* cited by examiner

*Primary Examiner* — Kee M Tung
*Assistant Examiner* — Nauman U Ahmad
(74) *Attorney, Agent, or Firm* — Harness, Dickey & Pierce, P.L.C.

(57) ABSTRACT

By a display control device, a display control method, a storage medium storing a display control program, a rule definition of screen transition is stored, the screen transition is arbitrated based on the rule definition of the screen transition and a screen transition result is generated, a rule definition of the screen transition animation is stored, the screen transition result is received, screen transition animation information is generated, an animation constraint expression is evaluated, and whether to execute a screen transition animation is determined in unit of a process of the screen transition, an instruction indicating whether to execute the screen transition animation is provided, a display of the screen transition animation is controlled.

8 Claims, 16 Drawing Sheets

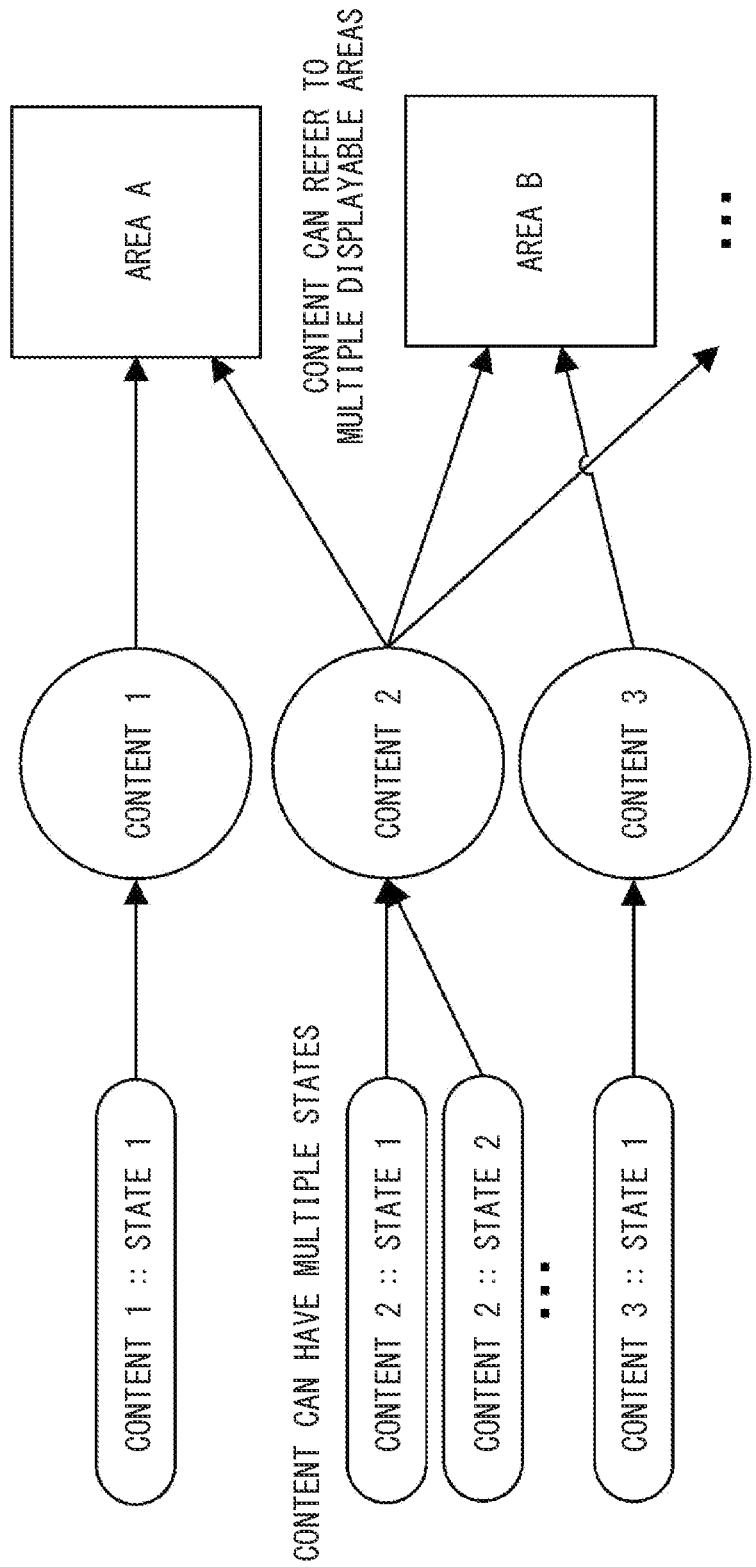

FIG. 7

| TYPE | NAME | DESCRIPTION | MEANING |
|---|---|---|---|
| AREA STATE REFERENCE | DURING DISPLAY | < AREA >.isDisplayed() | AREA HAS BEEN DISPLAYED (THEN, DISPLAY CONTENT IS ALWAYS ALLOCATED TO AREA) TRUE WHEN AREA HAS BEEN DISPLAYED |
| DISPLAY CONTENT STATE REFERENCE | DURING DISPLAY | < DISPLAY CONTENT >.isVisible() | DISPLAY CONTENT HAS BEEN DISPLAYED TRUE WHEN DISPLAY CONTENT HAS BEEN ALLOCATED TO ANY AREA |
| OPERATOR | NEGATION | ! <Bool EXPRESSION> | TRUE WHEN BOOLEAN EXPRESSION IS FALSE |
| | IMPLICATION | <Bool EXPRESSION> -> <Bool EXPRESSION> | A->B IS EQUAL TO ((A AND B) OR !A) |

FIG. 8

| TYPE | NAME | DESCRIPTION | MEANING |
|---|---|---|---|
| ANIME | CANCEL | < ANIME >.animationIsCanceled () | CANCEL ANIME REQUEST TRUE WHEN ANIME REQUEST IS CANCELLED |

FIG. 12

| | WARNING DISPLAY | NO WARNING DISPLAY | OTHER SCR TRANSITIONS |
|---|---|---|---|
| ANIME A | INTERRUPTION | Don't Care | Don't Care |
| ANIME B | INTERRUPTION | Don't Care | Don't Care |
| ANIME C | INTERRUPTION | Don't Care | Don't Care |

FIG. 16

|  | LATER REQUEST | | |
|---|---|---|---|
| | CONTENT a | CONTENT b | CONTENT c |
| EARLIER REQUEST | | | |
| CONTENT a | | EARLIER WIN | EARLIER WIN |
| CONTENT b | LATER WIN | | EARLIER WIN |
| CONTENT c | LATER WIN | LATER WIN | |

FIG. 17

| | DISPLAY OF CONTENT a | NO DISPLAY OF CONTENT a | DISPLAY OF CONTENT b | NO DISPLAY OF CONTENT b | DISPLAY OF CONTENT c | NO DISPLAY OF CONTENT c | OTHER SCR TRANSITIONS |
|---|---|---|---|---|---|---|---|
| ANIME A | EXECUTION START | INTERRUPTION | Don't Care | Don't Care | Don't Care | Don't Care | Don't Care |
| ANIME B | INTERRUPTION | Don't Care | EXECUTION START | INTERRUPTION | Don't Care | Don't Care | Don't Care |
| ANIME C | INTERRUPTION | Don't Care | INTERRUPTION | Don't Care | EXECUTION START | INTERRUPTION | Don't Care |

CONTENT DISPLAY CONTROL DEVICE, CONTENT DISPLAY CONTROL METHOD, AND STORAGE MEDIUM STORING CONTENT DISPLAY CONTROL PROGRAM

CROSS REFERENCE TO RELATED APPLICATIONS

The present application is a continuation application of International Patent Application No. PCT/JP2022/003090 filed on Jan. 27, 2022, which designated the U.S. and claims the benefit of priority from Japanese Patent Application No. 2021-026213 filed on Feb. 22, 2021. The entire disclosures of all of the above applications are incorporated herein by reference.

TECHNICAL FIELD

The present disclosure relates to a content display control device, a content display control method, and a storage medium storing a content display control program.

BACKGROUND

For example, there are a wide variety of contents displayed on a display device installed in a vehicle. Examples of the type of content include a travelling system content related to vehicle traveling, a non-travelling system content that is not related to vehicle travelling, and the like. Examples of the traveling system content include, for example, contents of a vehicle speed, an engine rotation speed, a shift position, the remaining amount of fuel, and the like. Examples of the non-traveling system content include, for example, contents of navigation map information, audio information, telephone information, and the like. The content is displayed in response to receiving a content display request from an application. In this case, when a content display request from another application is received while the content of one application is being displayed, arbitration is performed for determining which content should be preferentially displayed.

SUMMARY

By a display control device, a display control method, a storage medium storing a display control program, a rule definition of screen transition is stored, the screen transition is arbitrated based on the rule definition of the screen transition and a screen transition result is generated, a rule definition of screen transition animation is stored, the screen transition result is received, screen transition animation information is generated, an animation constraint expression is evaluated, and whether to execute a screen transition animation is determined in unit of a process of the screen transition, an instruction indicating whether to execute the screen transition animation is provided, a display of the screen transition animation is controlled.

BRIEF DESCRIPTION OF DRAWINGS

The above-described features and advantages of the present disclosure will become more apparent from the following detailed description with reference to the accompanying drawings.

FIG. 6 is a diagram showing a relationship between a content, a state, and an area.

FIG. 7 is a diagram showing a syntax of logical expressions.

FIG. 8 is a diagram showing a syntax of logical expressions.

FIG. 12 is a diagram showing a matrix specification.

FIG. 16 is a diagram showing a matrix specification.

FIG. 17 is a diagram showing a matrix specification.

DETAILED DESCRIPTION

Figure 1:
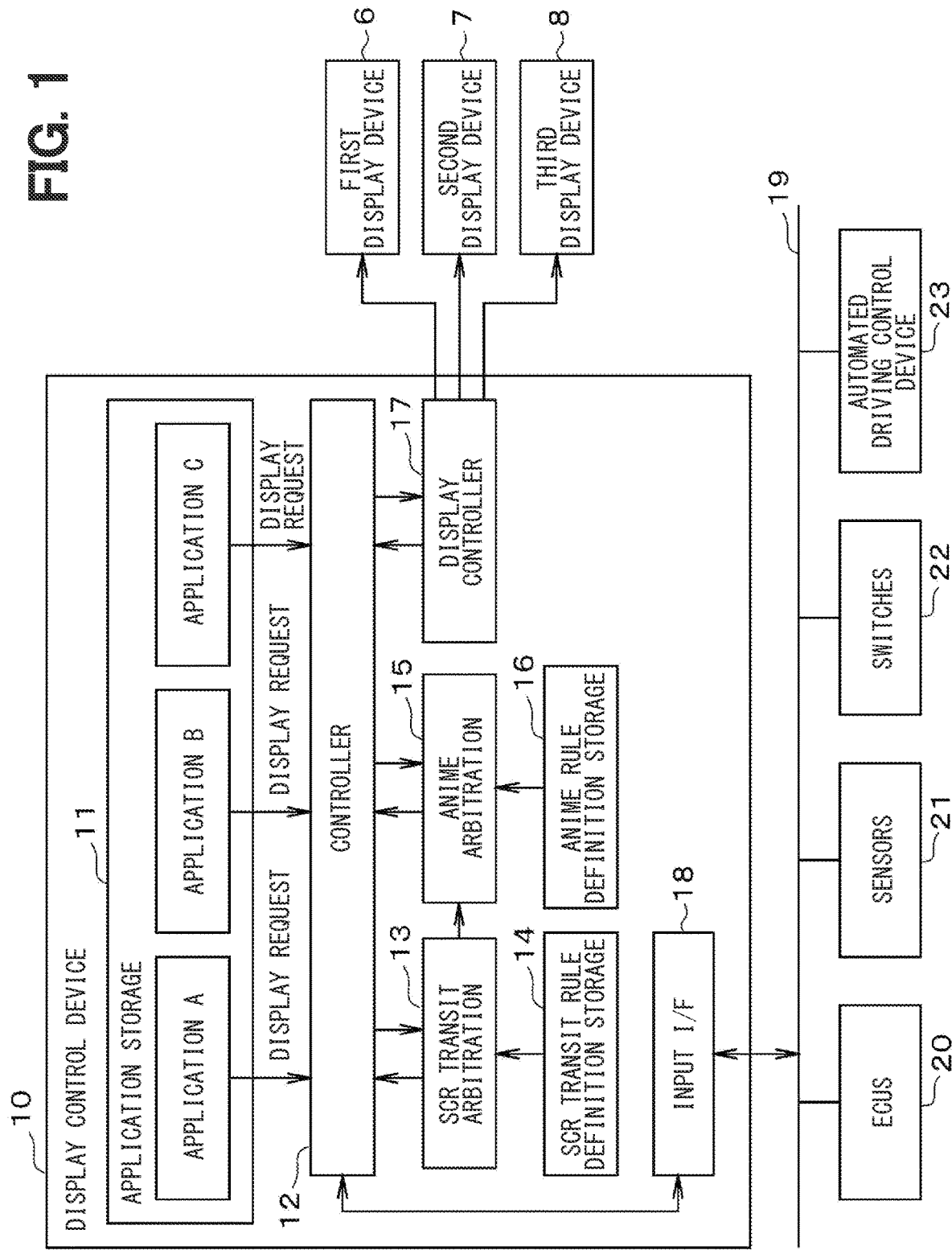
FIG. 1 is a functional block diagram showing a configuration of a display control device according to an embodiment.

By the way, in recent years, with the complication of content display control, a control of screen transition animation has also become complicating. The screen transition animation is, for example, an animation when transitioning from one content to another content in one area by crossfading, or an accompanying animation when one content moves and transitions from one area to another area. In a method for managing the state transition animation, a state transition table or a matrix table is generated for comprehensively visualizing and designing arbitration specifications showing a relationship between the screen transition animation and the screen transition.

However, in this method, it is necessary to analyze each event after extracting the content and screen transition animation, and it is not possible to flexibly deal with specification changes such as addition or change of content or screen transition animation. Further, since the state transition table and the matrix table become large in scale, even if the arbitration specifications can be managed and designed, errors may be likely to occur during implementation.

Furthermore, a comparative method only focuses on the control of content allocation. For example, when, during execution of screen transition animation that is movement of one content, screen transition animation of crossfade is executed and only the screen transition animation of movement is requested, it is not possible to control the screen transition animation by executing only the content allocation.

On the other hand, in another comparative example of the content display control, interference between screen transition animations is solved by rule-based arbitration. However, the comparative example, the screen transition animation at the time of interference between the screen transition animation and the screen transition without animation is not controlled. Under these circumstances, it is desired to easily manage the screen transition animation control.

The present disclosure relates to device, method, and program for easily managing a screen transition animation control.

According to one example embodiment, a display control device includes: an application storage configured to store an application; a screen transition rule definition storage configured to store a rule definition of screen transition; a screen transition arbitration unit configured to arbitrate the screen transition based on the rule definition of the screen transition and generate a screen transition result upon accepting a display request from the application; an animation rule definition storage configured to store a rule definition of screen transition animation; an animation arbitration unit configured to receive the screen transition result, generate screen transition animation information using the received screen transition result, evaluate an animation constraint expression, and determine whether to execute a screen transition animation in unit of a process of the screen transition; an execution instruction unit configured to provide an instruction indicating whether to execute the screen transition animation according to a determination result of the animation arbitration unit; and a display controller configured to control a display of the screen transition animation according to the instruction from the execution instruction unit.

According to another example embodiment, a display control method includes: by a display control device including: an application storage configured to store an application; a screen transition rule definition storage configured to store a rule definition of screen transition; and an animation rule definition storage configured to store a rule definition of screen transition animation, arbitrating the screen transition based on the rule definition of the screen transition and generating a screen transition result upon accepting a display request from the application; receiving the screen transition result; generating screen transition animation information using the received screen transition result; evaluating an animation constraint expression; determining whether to execute a screen transition animation in unit of a process of the screen transition; providing an instruction indicating whether to execute the screen transition animation according to a determination result of whether to execute the screen transition animation; and controlling a display of the screen transition animation according to the instruction.

Further, according to another example embodiment, a computer-readable non-transitory storage medium stores a display control program configured to cause a processor of a display control device including: an application storage configured to store an application; a screen transition rule definition storage configured to store a rule definition of screen transition; an animation rule definition storage configured to store a rule definition of screen transition animation, to: arbitrate the screen transition based on the rule definition of the screen transition and generate a screen transition result upon accepting a display request from the application; receive the screen transition result; generate screen transition animation information using the received screen transition result; evaluate an animation constraint expression; determine whether to execute a screen transition animation in unit of a process of the screen transition; provide an instruction indicating whether to execute the screen transition animation according to a determination result of whether to execute the screen transition animation; and control a display of the screen transition animation according to the instruction.

The display control device generates screen transition animation information using the screen transition result, evaluates the animation constraint expression, determines whether the screen transition animation should be executed in units of screen transition process, and controls the display of the screen transition animation. It is possible to control the screen transition animation at the time of interference between the screen transition animation and the screen transition without the animation by controlling the display of the screen transition animation in unit of the process of the screen transition without generating the state transition table or the matrix table. Thereby, it is possible to easily manage the control of the screen transition animation.

Figure 2:
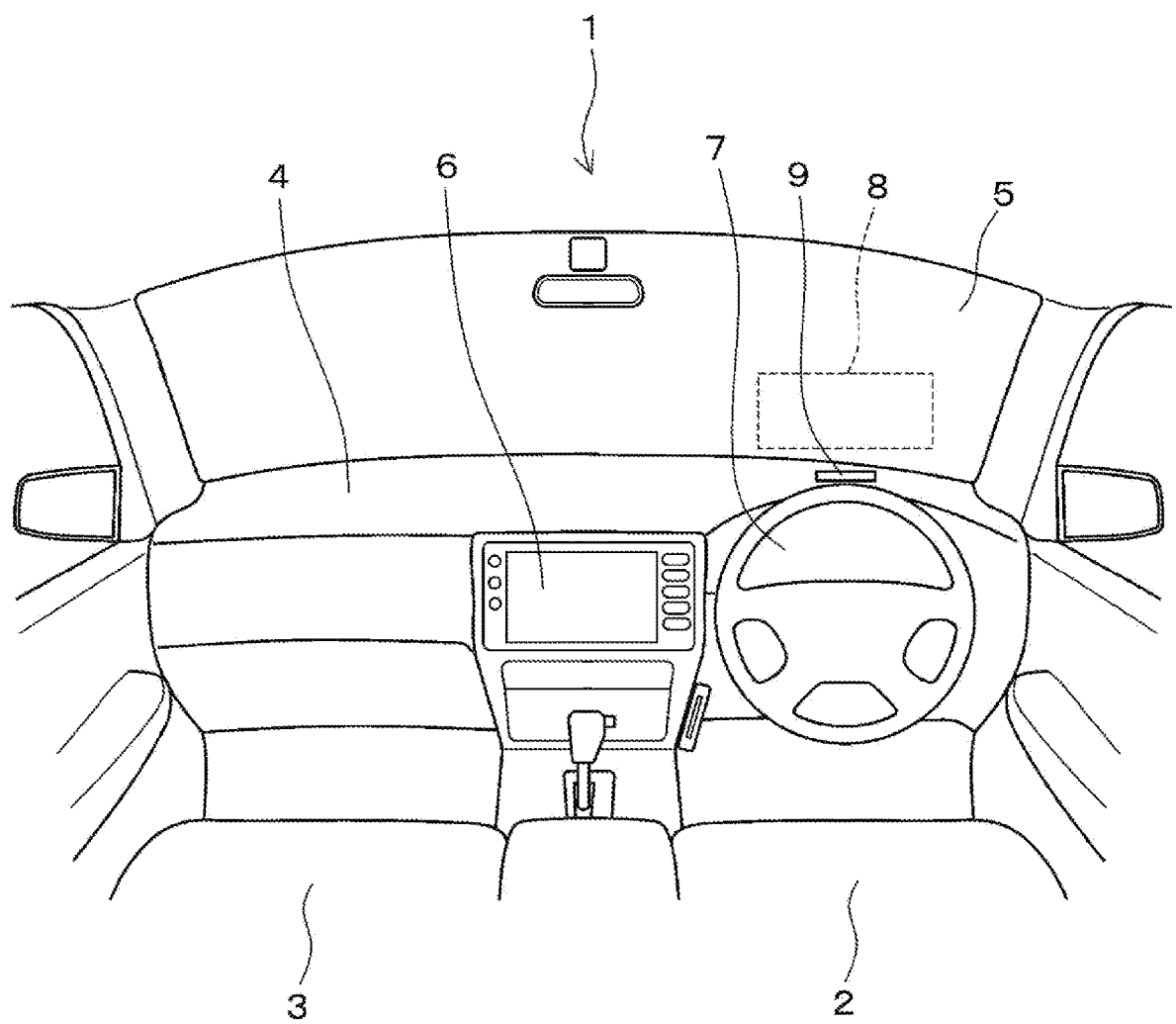
FIG. 2 is a perspective view showing a vehicle interior.

Hereinafter, an embodiment will be described with reference to the drawings. As shown in FIG. 2, a driver seat 2 and a passenger seat 3 are arranged in a vehicle compartment 1 of the vehicle, and an instrument panel 4 is arranged in front of them. A windshield 5 is mounted on the front end of the instrument panel 4 so as to stand up. A first display device 6 and a second display device 7 are arranged on the instrument panel 4, and a third display device 8 is arranged on the windshield 5.

The first display device 6 is, for example, a center display including a full-color liquid crystal display device, and basically functions as a display unit for displaying a non-traveling system content that is not related to vehicle traveling. The non-traveling system content includes, for example, map information for navigation, audio information, telephone information, and the like. The first display device 6 also functions as a display unit that displays an image of the rear of the vehicle captured by a rear camera when the vehicle is moving backward. The second display device 7 is, for example, a meter display including a full-color liquid crystal display device, and basically functions as a display unit for displaying a traveling system content that is related to the vehicle traveling. The traveling system content includes, for example, vehicle speed, engine speed, shift position, remaining amount of fuel, and the like. The third display device 8 is a head-up display in which an image is projected from a display unit 9 arranged on the instrument panel 4 onto the windshield 5, and basically functions as a display unit that displays the traveling system content, similar to the second display device 7. Each of the display devices 6 to 8 includes one or more areas for displaying the content. In such a configuration, a content is displayed on each of the display devices 6 to 8, thereby providing the occupant with various types of information including the traveling system content and the non-traveling system content.

As shown in FIG. 1, the display control device 10 includes an application storage 11, a controller 12, a screen transition arbitration unit 13, a screen transition rule definition storage 14, an animation arbitration unit 15, and an animation rule definition storage 16, a display controller 17, and an input-output I/F 18. In the drawings, the terms of "screen transition" may be also referred to as SCR TRANSIT, and the term of "animation" may be also referred to as "ANIME". The display control device 10 corresponds to a content display control device. The controller 12 corresponds to an execution instruction unit. Multiple applications A to C are stored in advance in the application storage 11. When a display request for one or more contents is generated, each of the applications A to C interposes and outputs to the controller 12 a display request indicating an area and a content showing a display target and a display region. The area is a region allocated when displaying the content.

The controller 12, the screen transition arbitration unit 13, the animation arbitration unit 15, and the display controller 17 have a microcomputer including a CPU (Central Processing Unit), a ROM (Read Only Memory), a RAM (Random Access Memory), an I/O (Input/Output), and the like, and execute a display control program stored in a non-transitory tangible storage medium to control the operation of the display control device 10.

The screen transition rule definition storage 14 stores a screen transition rule definition. The rule definition includes an arbitration policy that defines basic arbitration when assigning a content to an area, and a constraint expression. The arbitration policy is always set by any of priority arbitration, latter-content-win arbitration, and value-based arbitration, as will be described later. The constraint expression may not be limited to one, and may not be provided or may be provided with a plurality of equations according to the intention of the writer.

The screen transition arbitration unit 13 accepts the display request from the application in response to the display request being interposed and outputted to the controller 12 from the application. Upon accepting the display request, the screen transition arbitration unit 13 allocates the content to the area according to the screen transition rule definition stored in the screen transition rule definition storage 14 and generates a screen transition result. The screen transition arbitration unit 13 may simultaneously receive display requests from multiple different applications, and in such a case, arbitrates which content should be preferentially displayed. The expression of "simultaneously" here may not mean at the same time in chronological time, alternatively, may mean a state where a content display request from another application is accepted while one application is displaying the content, in other words, a state where display requests from two or more applications are simultaneously accepted.

The animation rule definition storage 16 stores animation rule definitions. When the screen transition result is input from the screen transition arbitration unit 13, the animation arbitration unit 15 generates screen transition animation information using the input screen transition result, evaluates an animation constraint expression, and determines whether to execute the screen transition animation for each process of the screen transition. After determining whether to execute the screen transition animation, the animation arbitration unit 15 notifies the application of the screen transition result and the screen transition animation information.

The controller 12 provides an instruction of whether to execute the screen transition animation according to the determination result of the animation arbitration unit 15. When the controller 12 instructs the display controller 17 to newly display the screen transition animation, the display controller 17 newly displays the screen transition animation according to the new display instruction. When the controller 12 instructs the display controller 17 to cancel the screen transition animation, the display controller 17 cancels the executing screen transition animation according to the cancellation instruction.

The input-output I/F 18 is connected to various ECUs 20, various sensors 21, various switches 22, an automated driving control device 23, and the like via an in-vehicle network 19. The in-vehicle network 19 is, for example, CAN (Controller Area Network, registered trademark) or the like.

The rule-based arbitration will be described below.

(1) Rule-Based Arbitration

The rule-based arbitration describes an arbitration method in which the content is arbitrated and allocated to an arbitrary area based on a predetermined rule. Area definitions, content definitions, and constraint expressions are required as rule definitions in the rule-based arbitration.

(1-1) Area Definition

The area definition defines a display location, a value of the display location, and an arbitration policy. Since arbitration is performed for each area, an arbitration policy is defined for each area.

In the area, a frame for displaying the content on the display devices 6 to 8 is defined. Only one content is allocated to one area.

The area is defined as follows.

The area displays the allocated content.

The area has an arbitration policy.

The area refers to the content that can be displayed.

The area has one or more sizes.

Each area has properties. The priority, Z-order, arbitration policy, and size are set as the properties.

(a) Priority

The priority is a value (in a range between 0% and 100%) indicating the value of the area itself. The arbitration is performed in order from the area with the highest priority value.

(b) Z-Order

The Z-order is a coordinate with respect to a height. The higher the Z-order value, the more it is displayed on the front side. When there are areas with the same priority, arbitration is performed in the descending order of Z-order value.

(c) Arbitration Policy

The arbitration policy is one of priority arbitration, latter-content-win arbitration, and value-based arbitration.

(c-1) Priority Arbitration

Figure 3:
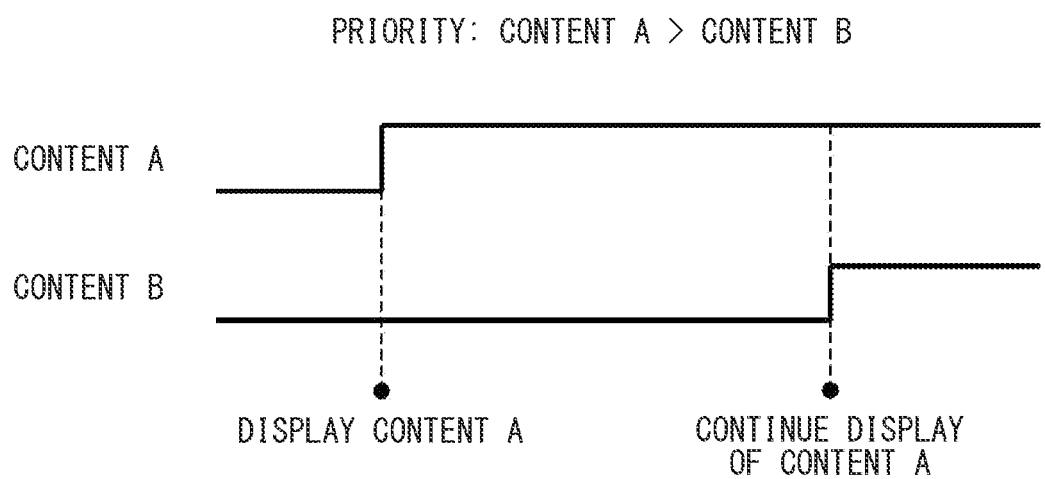
FIG. 3 is a diagram showing priority arbitration.

The priority arbitration is an arbitration policy for each area, and as shown in FIG. 3, it is arbitration that displays the content having the highest priority among the contents that can be displayed in the area.

(c-2) Latter-Content-Win Arbitration

Figure 4:
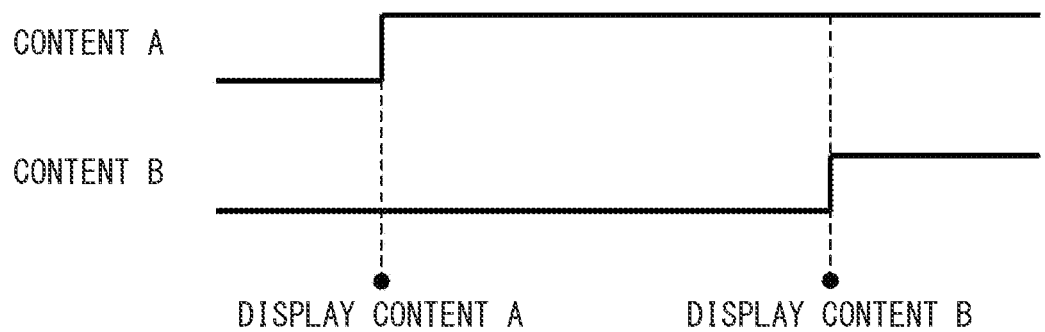
FIG. 4 is a diagram showing latter-content-win arbitration.

The latter-content-win arbitration is an area-based arbitration policy. As shown in FIG. 4, the content of the last request in the area is displayed, and when the display of the last request content is finished, the second last request among the remaining contents is displayed.

(c-3) Value-Based Arbitration

The value-based arbitration is an arbitration policy for the entire area, and is arbitration that displays the content that maximizes the calculated value obtained by multiplying the numerical value that quantifies the value of the content and the numerical value that quantifies the value of the area.

(d) Size

Figure 5:
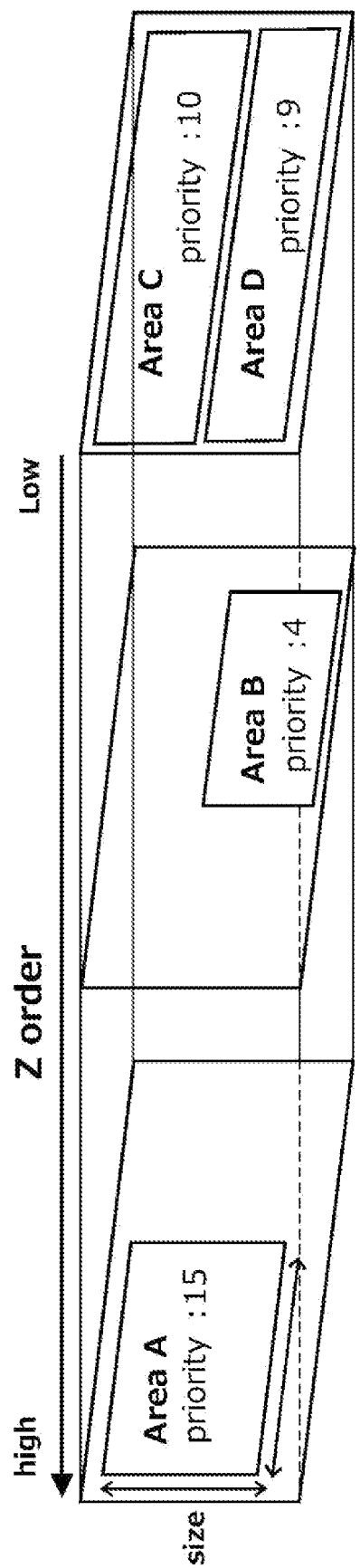
FIG. 5 is a diagram showing a relationship between a Z-order of an area and a priority.

The size is the size of the area, which is defined by a vertical size x a horizontal size. When more than one sizes are defined, it is determined according to the size of the content. The relationship between the Z-order of the area and the priority is shown in FIG. 5.

(1-2) Content Definition

The content definition defines the displayable area, the state of the content, and the value of the state of the content. The content can have multiple states, the content is allocated to the area, and the content status is displayed. The content defines and refers to the area in which the content itself can be displayed.

The content to be displayed in the area defined on the display screens of the display devices 6 to 8 is defined. Only one content is allocated to one area.

The content is defined as follows.

The content is assigned to the area.

The content refers to one or more areas in which the content itself can be displayed.

The content always has one or more states.

The content has one or more sizes.

When there are multiple displayable areas, the content can be displayable in any one of areas, and one content can be simultaneously displayed in multiple areas. One content can have multiple states. When one content have multiple states, each state is exclusive and can always be displayed only in one state at one time. The content can have multiple sizes. When the content have multiple sizes, the closest size is displayed with respect to the size of the display target area. The relationship between a content, a state, and an area is linked as shown in FIG. 6.

The content has a property, and the property is set with an attribute indicating the priority, the size, the feature of whether the display request is withdrawn (i.e., cancelled) or not withdrawn (i.e., on standby) when the content loses the arbitration.

(a) Priority

The priority is a value used when the arbitration policy of the area is "priority arbitration", and the content having a high priority is allocated to the area first.

(b) Size

The size is the display size of the content and is defined by a vertical size x a horizontal size. When more than one sizes are defined, it is determined according to the size of the area.

(1-3) Constraint Expression

The constraint expression is a rule that describes the properties that must be exceptionally satisfied during or after arbitration. By suppressing the state of arbitration with the constraint expression, it is possible to express a state that cannot be expressed by the arbitration policy as it is, or to use it for determining the arbitration result after arbitration. That is, for example, depending on the situation such as the traveling state of the vehicle, it may be better not to display even the content allocated by the arbitration policy. The constraint expression defines the conditions for content suppression and area suppression, which are the conditions that the arbitration result must satisfy.

The logical expression that can be handled by the constraint expression is the content state, the area state, the content being displayed in the area, the set of the area and the content, the scene state, the logical operation, and the quantification symbol. The scene is, for example, a manual driving scene or an automatic driving scene by an automated driving device 19, and display control is possible in which the content of a manual driving content group is not displayed in an automated driving scene.

(a) The content state is any of an active state, an inactive state, a displayed state, a hidden state.

(b) The area state is either displayed or hidden.

(c) The logical operations include NOT (!), AND, OR, implication (->), and equal sign (=).

The quantification symbols include $\forall$ (For all: the condition is satisfied for all elements of the set) and $\exists$ (Exists: at least one element satisfying the condition exists in the set)

(d) Constraint Expression

The constraint expression affects the result of the arbitration logic, and the arbitration logic is set to satisfy all constraints.

(1-4) Content Suppression

For example, "central area.displaying Content ( )=c1->! C2.is Visible ( )" is exemplified as a constraint expression that the content c2 is not displayed while the content c1 is being displayed. This constraint expression describes the suppression that the content c2 is not displayed when the content c1 is being displayed in the central area.

(1-5) Priority Arbitration and Latter-Content-Win Arbitration

When the priority arbitration and the latter-content-win arbitration coexist, it is possible to handle them by setting the arbitration policy of the area to the latter-content-win arbitration and by describing only the relationship between the contents related to the priority with used of the constraint expression.

As such a constraint expression, "telephone.is Active ( )-> For All MM type interposing content (other than telephone) {x |! X.is Visible ( )}" is illustrated. The arbitration policy is the area of the latter-content-win arbitration, and describes the suppression that all multimedia type interposing content (other than the telephone) are not displayed when the content with the high priority, i.e., the telephone, is active by adding this constraint expression.

(2) Arbitration Logic

The arbitration logic is an algorithm that defines how to allocate the content to satisfy a constraint expression based on an area arbitration policy according to a predetermined rule. Basically, the arbitration is performed in the order of priority for each area. The arbitration logic includes arbitration within the area and arbitration for the entire area.

(2-1) Arbitration in Area (a) In the arbitration within the area, the area in the priority arbitration and the latter-content-win arbitration is arbitrated in the descending order of priority.

(b) The following feature is evaluated for each area.

The highest priority content is tentatively allocated. When the evaluation result of the constraint expression is true, the tentatively allocated content is determined. When the evaluation result of the constraint expression is false, the next highest priority content is re-evaluated. When there is no content that satisfies the constraint expression, no content is displayed in the area.

(2-2) Arbitration of Entire Area

The arbitration (value-based arbitration) for the entire area includes best fit logic and one-pass logic.

(a) The best fit logic selects the highest total value among all the combinations of the contents satisfying the constraint expression and the areas.

(B) The one-pass logic allocates the content with the highest priority to the area in order from the area with the higher priority, and excludes the content already allocated to the other area. In this embodiment, the one-pass logic is adopted, alternatively, the best-fit logic may be adopted.

In a comparative method for managing the state transition animation, a state transition table or a matrix table is generated for comprehensively visualizing and designing arbitration specifications showing a relationship between the screen transition animation and the screen transition. However, this method has a difficulty that it is not possible to flexibly cope with specification changes such as additions and changes of contents and screen transition animations, and a difficulty that an error may occur during implementation. Under these circumstances, a method that can easily manage the control of the screen transition animation is desired, and the following configuration is adopted in the present embodiment.

In the present embodiment, the syntax of a logical expression representing cancellation of the screen transition animation shown in FIG. 8 is added to an example of the syntax of a logical expression that can be handled by the constraint expression shown in FIG. 7. By adding the syntax of the logical expression that expresses the cancellation of the screen transition animation, it becomes possible to control the screen transition animation for each screen transition. An animation constraint expression is generated by combining a screen transition condition obtained by combining the syntax shown in FIG. 7 and the syntax shown in FIG. 8 with information indicating which screen transition animation is to be controlled.

A description example of the animation constraint expression is shown below.

For example, a control of "When Content 1 is displayed, cancel Anime A" can be described by an expression of 1801422937 Content1.isVisible( )->
   AnimeA.animationIsCanceled( ). For example, a control of "When Area A is hidden, cancel Anime A" can be described by an expression of ! AreaA.isDisplayed( )-> AnimeA.animation IsCanceled( ).

Figure 9:
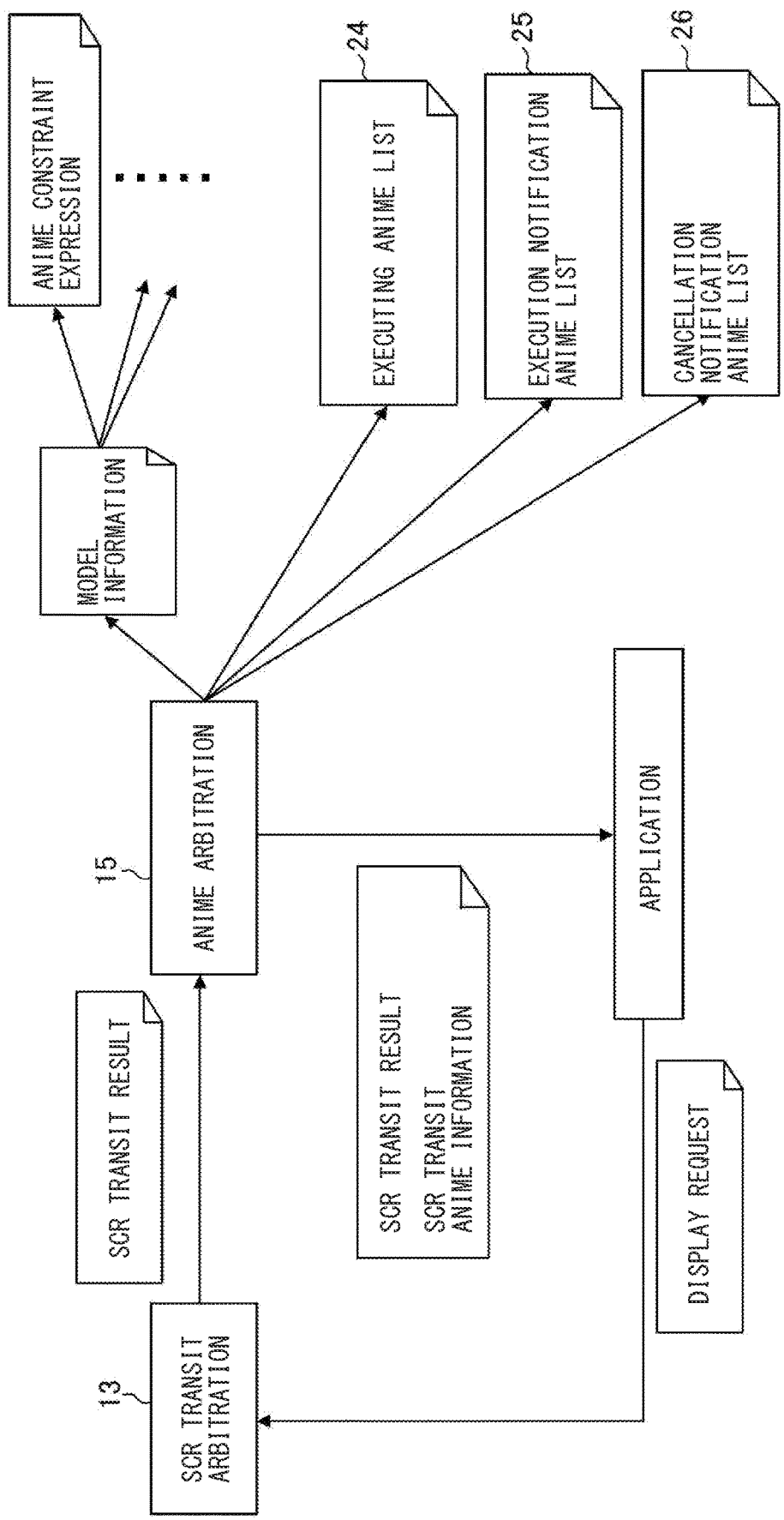
FIG. 9 is a diagram showing a system configuration.

As shown in FIG. 9, the animation arbitration unit 15 includes a executing animation list 24 that stores information of animations that are being executed, an execution notification animation list 25 that stores information of animations that are execution notification targets, and a cancellation notification animation list 26 that stores information of animation that is a cancellation notification target. The animation arbitration unit 15 refers to the executing animation list 24 to evaluate the animation constraint expression, and determines whether the animation constraint expression is satisfied when the screen transition animation, which is the arbitration target, is in the executing state. Thereby, the animation to be arbitrated is added to either the execution notification animation list 25 or the cancellation notification animation list 26.

Figure 10:
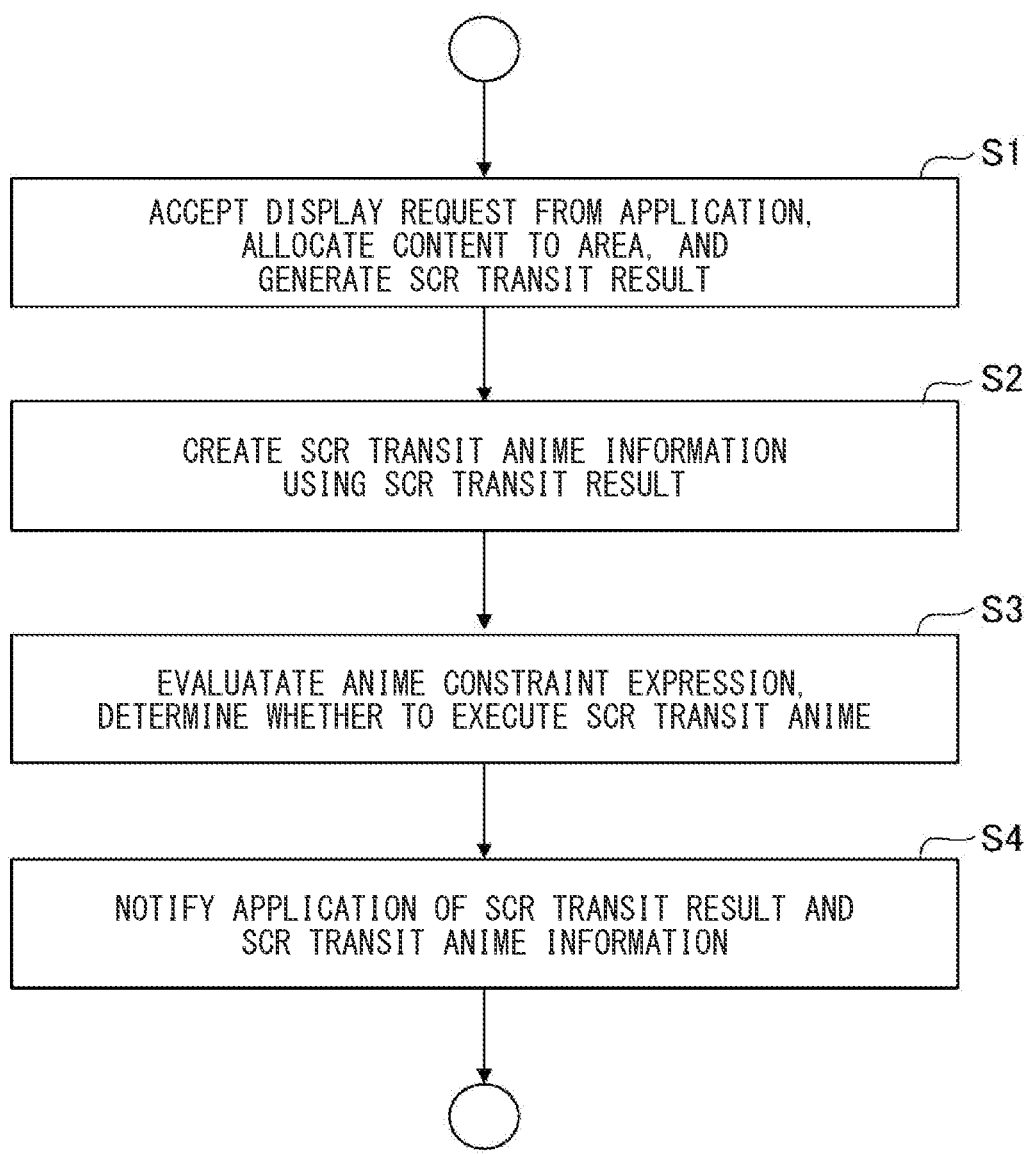
FIG. 10 is a flowchart showing an overall process.
Figure 11:
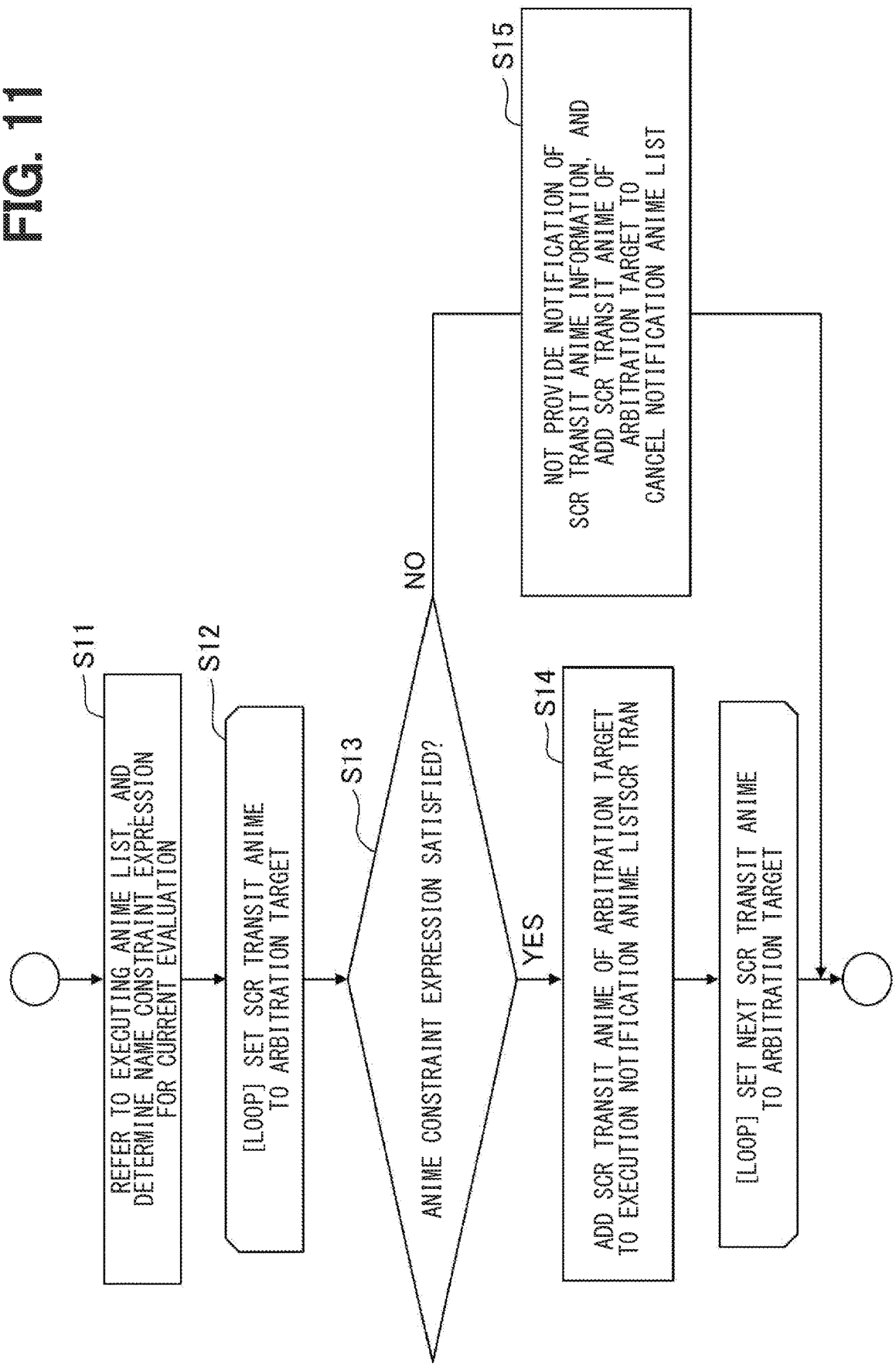
FIG. 11 is a flowchart showing an animation constraint expression evaluation process.

The display control device 10 executes the entire process shown in FIG. 10 and an animation constraint expression evaluation process shown in FIG. 11. When the entire process starts, the display request from the application is interposed and outputted by the controller 12, and thereby, the display request from the application is accepted by the screen transition arbitration unit 13. In response to the acceptance, the display control device 10 allocates the content to the area and generates the screen transition result (S1, screen transition arbitration procedure).

The display control device 10 generates screen transition animation information using the screen transition result (S2). The display control device 10 shifts to the animation constraint expression evaluation process, evaluates the animation constraint expression based on the animation rule definition stored in the animation rule definition storage 16, determines execution or non-execution of the screen transition animation in units of screen transition process (S3, animation arbitration procedure).

When starting the animation constraint expression evaluation process, the display control device 10 refers to the executing animation list 24 and determines the animation constraint expression to be evaluated this time (S11). The display control device 10 arbitrates the screen transition animations included in the executing animation list 24 (S12), and determines whether the screen transition animations, which are the arbitration targets, satisfy the animation constraint expression in an executing state (S13).

When the display control device 10 determines that the animation constraint expression in the executing state of the screen transition animation that is the arbitration target (S13: YES) and when the screen transition animation, which is the arbitration target, has not yet been executed, the screen transition animation, which is the animation target, is added to the execution notification animation list 25 (S14).

On the other hand, when the display control device 10 determines that the animation constraint expression for when the arbitration target screen transition animation is in the executing state is not satisfied (S13: NO), when the arbitration target screen transition animation has not executed yet, and when the screen transition animation information is not notified and the arbitration target screen transition animation is being executed, the arbitration target screen transition animation is added to the cancellation notification animation list 26 (S15).

After ending the animation constraint expression evaluation process, the display control device 10 notifies the application of the screen transition result and the screen transition animation information (S4), and ends the entire process.

Specific examples of rule-based animation constraint expressions will be described below.

(1) First Specific Example of Animation Constraint Expression

In order to satisfy a rule that "all screen transition animations are interrupted when a warning display screen transition occurs during execution of a certain screen transition animation", a matrix table shown in FIG. 12 is generated according to a comparative matrix specifications. On the other hand, the rule-based specification of the present embodiment can be described by the following animation constraint expressions.

animationConstraint Suspend all screen transition animations when a warning display screen transition occurs {Warning.isVisible( )-> For-All {animeA, animeB, animeC} {x|x.animation IsCanceled()}}

In this case, the display control device 10 operates as follows when displaying the door open content with a fade-in animation. As shown in FIGS. 13A to 13D and 14A to 14C, the display control device 10 displays a ring content 31 in a content displayable area, and a time information 32 indicating time on the right side of the ring content 31 when viewed from the front, shift position information 33 indicating a shift position and total travel distance information 34 indicating the total travel distance. The ring content 31 has a vehicle speed display portion 31a that displays the vehicle speed and a circular engine speed display portion 31b that displays the engine speed.

Figure 13A:
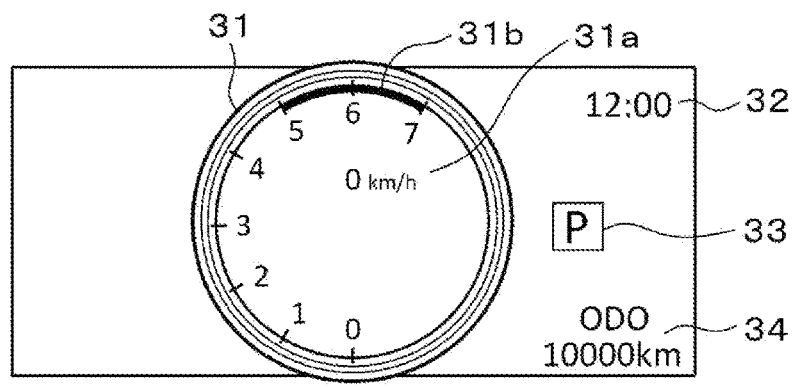
FIG. 13A is a diagram showing a screen transition animation (in a normal case).
Figure 13B:
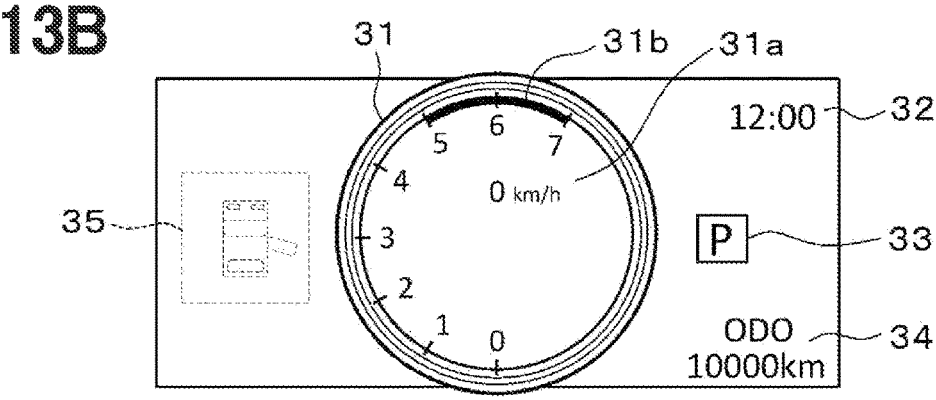
FIG. 13B is a diagram showing a screen transition animation (in the normal case).
Figure 13C:
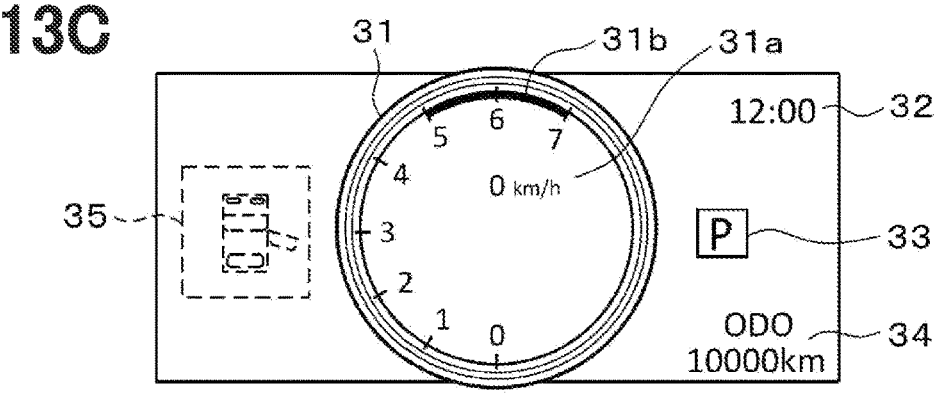
FIG. 13C is a diagram showing a screen transition animation (in the normal case).
Figure 13D:
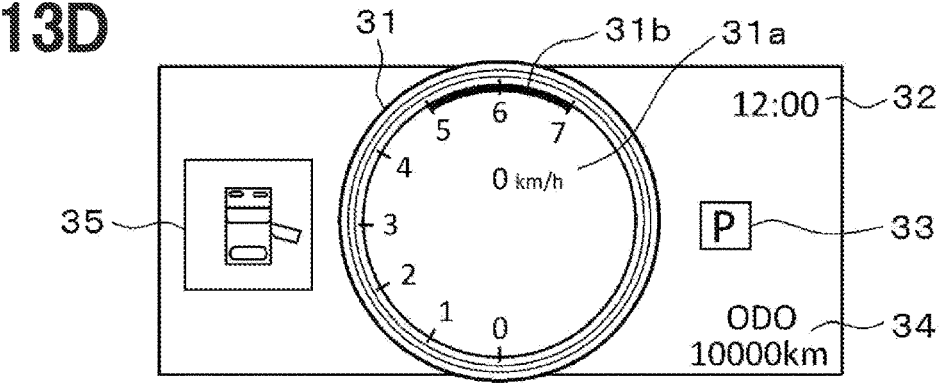
FIG. 13D is a diagram showing a screen transition animation (in the normal case).
Figure 14A:
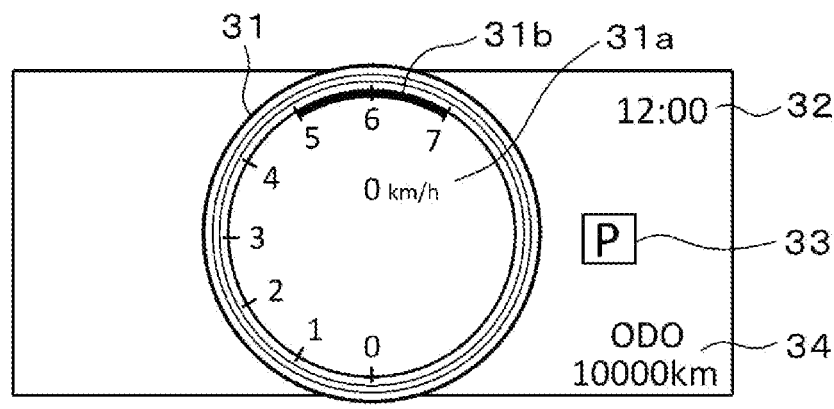
FIG. 14A is a diagram showing a screen transition animation (in a cancellation case).
Figure 14B:
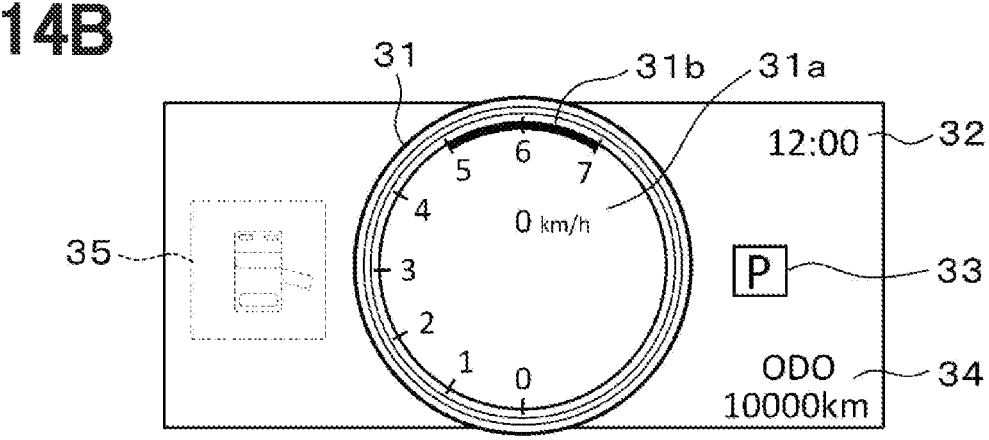
FIG. 14B is a diagram showing a screen transition animation (in the cancellation case).
Figure 14C:
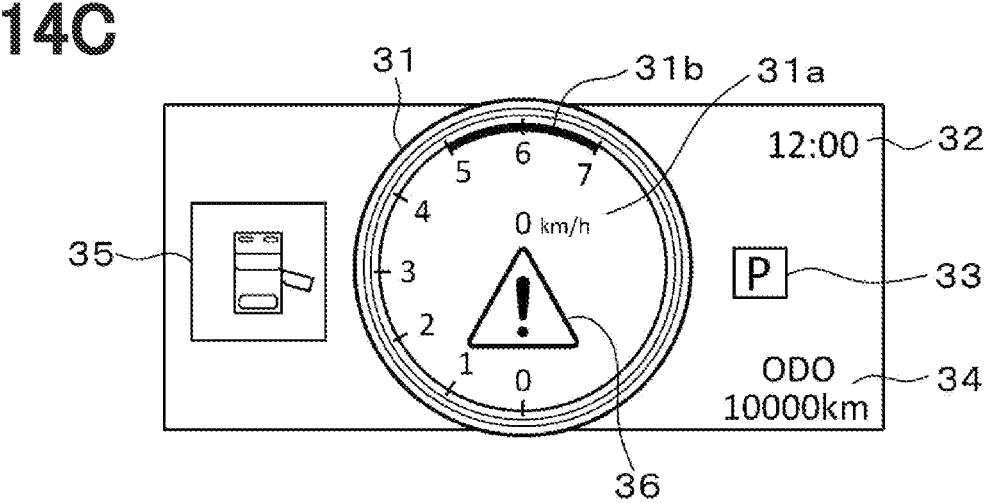
FIG. 14C is a diagram showing a screen transition animation (in the cancellation case).

In this state, when a request for displaying the door opening content is received from the application, the display control device 10 starts displaying a door open content 35 by fade-in animation on the left side of the ring content 31 when viewed from the front (see FIG. 13B and FIG. 14B). The display control device 10 unclearly displays the door open content 35 in a relatively weak display density manner immediately after starting the display by the fade-in animation.

After that, when no warning content display request is accepted from the application before the fade-in animation display of the door open content 35 ends, the display control device 10 continues to display the door open content 35 with the fade-in animation. The display control device 10 continues to display the door open content by the fade-in animation. Thereby, the display control device 10 gradually increases the intensity of the display of the door open content 35 over time, and finally makes the display of the door open content 35 clear (see FIGS. 13C and 13D).

On the other hand, upon accepting the warning content display request from the application before the fade-in animation display of the door open content 35 ends, the display control device 10 displays a warning content 36, and does not continue the display of the fade-in animation to cancel it. To cancel is to discontinue and agree. The display control device 10 cancels the display of the door open content by the fade-in animation. Thereby, the display control device 10 immediately increases the display density of the door open content 35 and immediately sets the display density of the door open content 35 to the final level (see FIG. 14C).

Figure 15:
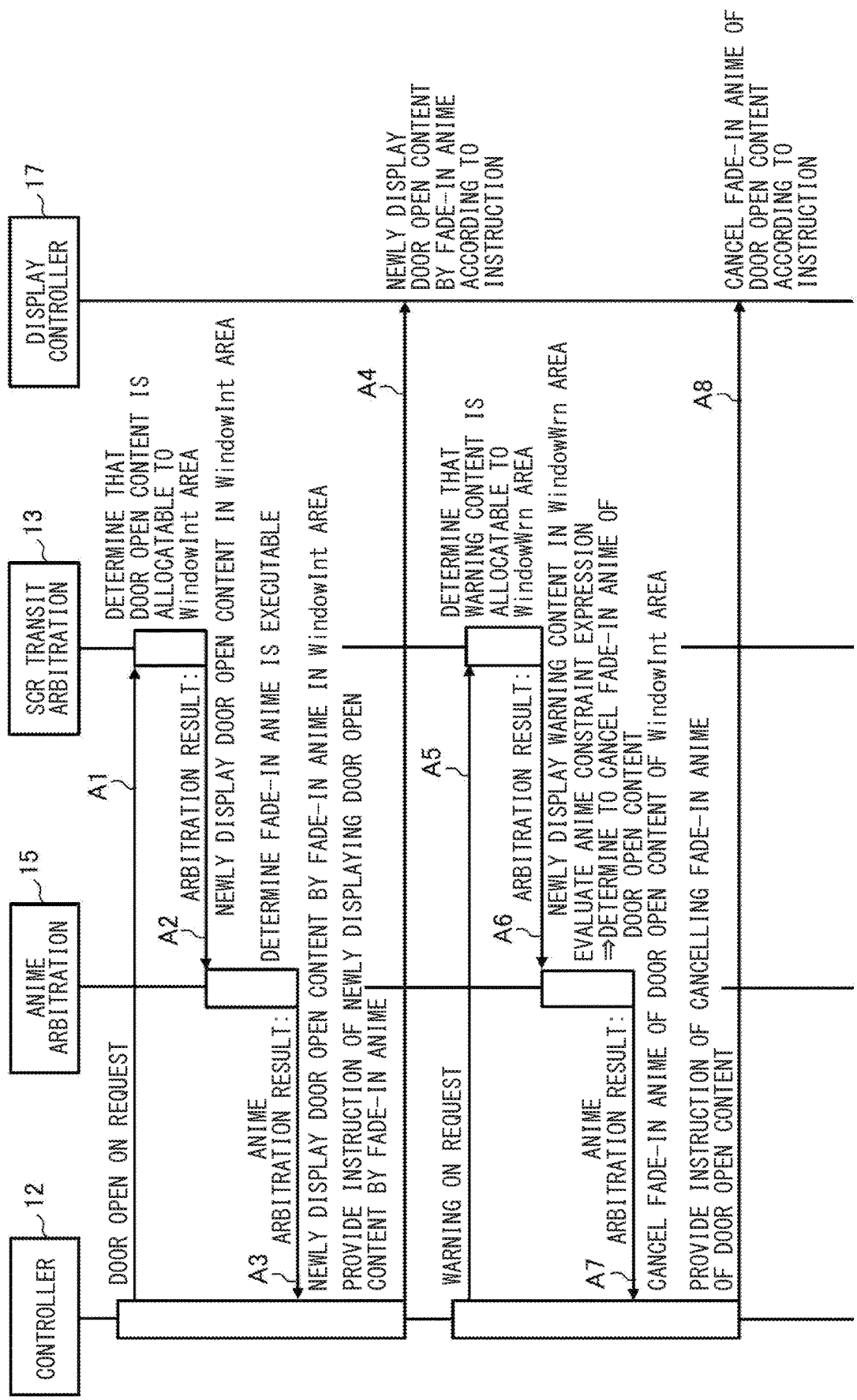
FIG. 15 is a diagram showing a flow of arbitration logic.

The arbitration logic flow is shown in FIG. 15.

Precondition: There is a WindowWrn area and a WindowInt area where nothing is displayed.

Scenario: A display request for the door open content is accepted and a new display instruction for the fade-in animation of the door open content is outputted. After that, a request for displaying the warning content is accepted, and an instruction to cancel the fade-in animation of the door open content is output.

When accepting a request to display the door open content from the application, the controller 12 outputs a door open ON request to the screen transition arbitration unit 13 (A1). When the door open ON request is input from the controller 12, the screen transition arbitration unit 13 determines that the door open content can be allocated to the WindowInt area, outputs the arbitration result to the animation arbitration unit 15, and outputs a message to newly display the door open content in the WindowInt area to the animation arbitration unit 15 (A2).

Upon receiving the arbitration result from the screen transition arbitration unit 13, the animation arbitration unit 15 performs an interference check based on the animation rule definitions stored in the animation rule definition storage 16. Here, since nothing is displayed in the WindowInt area as the precondition, the animation arbitration unit 15 determines that the fade-in animation of the door open content can be executed. The animation arbitration unit 15 outputs the animation arbitration result to the controller 12, and outputs notification that the door open content is newly displayed in the WindowInt area by the fade-in animation to the controller 12 (A3).

When the animation arbitration result is input from the animation arbitration unit 15, the controller 12 outputs to the display controller 17 an instruction to newly display the door open content with the fade-in animation according to the input animation arbitration result (A4) (execution instruction procedure). When receiving the instruction to newly display the door open content with fade-in animation from the controller 12, the display controller 17 newly displays the fade-in animation of the door open content based on the input instruction (display control procedure).

Subsequently, when the warning content display request is input from the application, the controller 12 outputs a warning ON request to the screen transition arbitration unit 13 (A5). When the warning ON request is input from the controller 12, the screen transition arbitration unit 13 determines that the warning content can be allocated to the WindowWrn area, outputs the arbitration result to the animation arbitration unit 15, and outputs to the animation arbitration unit 15 a notification that the warning content is newly displayed in the WindowWrn area (A6).

Upon receiving the arbitration result from the screen transition arbitration unit 13, the animation arbitration unit 15 performs an interference check based on the animation rule definitions stored in the animation rule definition storage 16. Here, the animation arbitration unit 15 evaluates the animation constraint expression, determines to cancel the fade-in animation of the door open content, outputs the animation arbitration result to the controller 12, and outputs the notification indication the cancellation of the fade-in animation of the door open content in the WindowInt area to the control unit 12 (A7).

When the animation arbitration result is input from the animation arbitration unit 15, the controller 12 outputs to the display controller 17 an instruction to cancel the door open content with the fade-in animation according to the input animation arbitration result (A8). When receiving the instruction to cancel the door open content with fade-in animation from the controller 12, the display controller 17 cancels the fade-in animation of the door open content based on the input instruction (display control procedure).

(2) Second Specific Example of Animation Constraint Expression

In order to satisfy a rule that "during execution of a certain content screen transition animation, when a hidden condition of the content is satisfied and a hidden screen transition occurs, the screen transition animation is interrupted and hidden", matrix tables shown in FIGS. 16 and 17 are generated according to the comparative matrix specifications. On the other hand, the rule-based specification of the present embodiment can be described by the following animation constraint expressions. An anime A is interrupted when the hidden condition of an animation constraint content a is satisfied.{! Content a.isVisible( )-> animeA.animationIsCanceled( )} An anime B is interrupted when the hidden condition of an animation constraint content b is satisfied. {! Content b.isVisible( )-> animeB.animationIsCanceled( )} An anime C is interrupted when the hidden condition of an animation constraint content c is satisfied.{! Content c.isVisible( )-> animeC.animationIsCanceled( )}

According to the present embodiment, the following effects can be obtained. The display control device 10 generates screen transition animation information using the screen transition result, evaluates the animation constraint expression, determines whether the screen transition animation should be executed in units of screen transition process, and controls the display of the screen transition animation. The display of screen transition animation is controlled in units of the screen transition process without generation of the state transition table or the matrix table. Thereby, it is possible to control the screen transition animation at the time of interference between the screen transition animation and the screen transition with no animation. Thereby, it is possible to easily manage the control of the screen transition animation.

When it is determined that the animation constraint expression for when the screen transition animation of the arbitration target is in the executing state is satisfied and when the screen transition animation, which is the arbitration target, has not yet been executed, the screen transition animation, which is the animation target, is added to the execution notification animation list 25. The screen transition animation of the arbitration target animation that satisfies the animation constraint expression can be managed by the execution notification animation list 25.

When it is determined that the animation constraint expression is not satisfied in the executing state of the screen transition animation, which is the arbitration target, and when the screen transition animation, which is the arbitration target, is being executed, the screen transition animation, which is the animation target, is added to the cancellation notification animation list 26. The screen transition animation of the arbitration target animations that does not satisfy the animation constraint expression can be managed by the cancellation notification animation list 26.

Although the present disclosure has been made in accordance with the embodiments, it is understood that the present disclosure is not limited to such embodiments and structures. The present disclosure incorporates various modifications and variations within a scope of equivalents. Additionally, various combinations and configurations, as well as other combinations and configurations including more, less, or only a single element, are within the scope and spirit of the present disclosure. It may be applied not only to the vehicle but also to the content display control device for purposes other than the vehicle.

The controller and method described in the present disclosure may be implemented by a special purpose computer provided by configuring a memory and a processor programmed to execute one or more functions embodied by a computer program. Alternatively, the controller and the method thereof described in the present disclosure may be implemented by a dedicated computer provided by configuring a processor with one or more dedicated hardware logic circuits. Alternatively, the controller and the method thereof described in the present disclosure may be implemented by one or more dedicated computers configured by a combination of a processor and a memory programmed to execute one or more functions and a processor configured by one or more hardware logic circuits. The computer program may be stored in a computer-readable non-transitory tangible storage medium as an instruction to be executed by the computer.

The invention claimed is:

1. A content display control device comprising:
an application storage configured to store an application;
a screen transition rule definition storage configured to store a rule definition of screen transition;
a screen transition arbitration unit configured to
arbitrate the screen transition based on the rule definition of the screen transition and
generate a screen transition result upon accepting a display request from the application;
an animation rule definition storage configured to store a rule definition of screen transition animation;
an animation arbitration unit configured to
receive the screen transition result,
generate screen transition animation information using the received screen transition result,
evaluate an animation constraint expression, and
determine whether to execute a screen transition animation in unit of a process of the screen transition;
an execution instruction unit configured to provide an instruction indicating whether to execute the screen transition animation according to a determination result of the animation arbitration unit; and
a display controller configured to control a display of the screen transition animation according to the instruction from the execution instruction unit, wherein
the animation arbitration unit evaluates the animation constraint expression when the screen transition animation, which is an arbitration target, is in an executing state, and
when the animation arbitration unit has determined that the animation constraint expression in the executing state of the arbitration target is satisfied and when the screen transition animation, which is the arbitration target, has not been executed, the animation arbitration unit adds the screen transition animation, which is the arbitration target, to an execution notification animation list,
the content display control device further includes at least one of (i) a circuit and (ii) a processor with a memory storing computer program code executable by the processor, the at least one of the circuit and the processor configured to cause the content display control device to serve as: the screen transition arbitration unit; the animation arbitration unit; the execution instruction unit; and the display controller.

2. The content display control device according to claim 1, wherein
the execution instruction unit provides an instruction for canceling the screen transition animation when the animation arbitration unit determines not to execute the screen transition animation.

3. The display control device according to claim 1, further comprising:
a processor that serves as the screen transition arbitration unit, the animation arbitration unit, the execution instruction unit, and the display controller.

4. A content display control device comprising:
an application storage configured to store an application;
a screen transition rule definition storage configured to store a rule definition of screen transition;
a screen transition arbitration unit configured to
arbitrate the screen transition based on the rule definition of the screen transition and
generate a screen transition result upon accepting a display request from the application;
an animation rule definition storage configured to store a rule definition of screen transition animation;
an animation arbitration unit configured to
receive the screen transition result,
generate screen transition animation information using the received screen transition result,
evaluate an animation constraint expression, and
determine whether to execute a screen transition animation in unit of a process of the screen transition;
an execution instruction unit configured to provide an instruction indicating whether to execute the screen transition animation according to a determination result of the animation arbitration unit; and
a display controller configured to control a display of the screen transition animation according to the instruction from the execution instruction unit, wherein
the animation arbitration unit evaluates the animation constraint expression when the screen transition animation, which is an arbitration target, is in an executing state, and
when the animation arbitration unit has determined that the animation constraint expression in the executing state of the arbitration target is not satisfied during execution of the screen transition animation which is the arbitration target, the animation arbitration unit adds the screen transition animation, which is the animation target, to a cancellation notification animation list,
the content display control device further includes at least one of (i) a circuit and (ii) a processor with a memory storing computer program code executable by the processor, the at least one of the circuit and the processor configured to cause the content display control device to serve as: the screen transition arbitration unit; the animation arbitration unit; the execution instruction unit; and the display controller.

5. A display control method comprising:
by a display control device including: an application storage configured to store an application; a screen transition rule definition storage configured to store a rule definition of screen transition; and an animation rule definition storage configured to store a rule definition of screen transition animation,
arbitrating the screen transition based on the rule definition of the screen transition and generating a screen transition result upon accepting a display request from the application;
receiving the screen transition result;
generating screen transition animation information using the received screen transition result;
evaluating an animation constraint expression;
determining whether to execute a screen transition animation in unit of a process of the screen transition;
providing an instruction indicating whether to execute the screen transition animation according to a determination result of whether to execute the screen transition animation; and
controlling a display of the screen transition animation according to the instruction, wherein
the animation constraint expression is evaluated when the screen transition animation, which is an arbitration target, is in an executing state, and
when the animation constraint expression in the executing state of the arbitration target is determined to be satisfied and when the screen transition animation, which is the arbitration target, has not been executed, the screen transition animation, which is the arbitration target, is added to an execution notification animation list.

6. A computer-readable non-transitory storage medium storing a display control program configured to cause a processor of a display control device including: an application storage configured to store an application; a screen transition rule definition storage configured to store a rule definition of screen transition; and an animation rule definition storage configured to store a rule definition of screen transition animation, to:
arbitrate the screen transition based on the rule definition of the screen transition and generate a screen transition result upon accepting a display request from the application;
receive the screen transition result;
generate screen transition animation information using the received screen transition result;
evaluate an animation constraint expression;
determine whether to execute a screen transition animation in unit of a process of the screen transition;
provide an instruction indicating whether to execute the screen transition animation according to a determination result of whether to execute the screen transition animation; and
control a display of the screen transition animation according to the instruction, wherein
the animation constraint expression is evaluated when the screen transition animation, which is an arbitration target, is in an executing state, and
when the animation constraint expression in the executing state of the arbitration target is determined to be satisfied and when the screen transition animation, which is the arbitration target, has not been executed, the screen transition animation, which is the arbitration target, is added to an execution notification animation list.

7. A display control method comprising:
by a display control device including: an application storage configured to store an application; a screen transition rule definition storage configured to store a rule definition of screen transition; and an animation rule definition storage configured to store a rule definition of screen transition animation,
arbitrating the screen transition based on the rule definition of the screen transition and generating a screen transition result upon accepting a display request from the application;
receiving the screen transition result;
generating screen transition animation information using the received screen transition result;
evaluating an animation constraint expression;
determining whether to execute a screen transition animation in unit of a process of the screen transition;
providing an instruction indicating whether to execute the screen transition animation according to a determination result of whether to execute the screen transition animation; and
controlling a display of the screen transition animation according to the instruction, wherein
the animation constraint expression is evaluated when the screen transition animation, which is an arbitration target, is in an executing state, and
when the animation constraint expression in the executing state of the arbitration target is determined not to be satisfied during execution of the screen transition animation which is the arbitration target, the screen transition animation, which is the animation target, is added to a cancellation notification animation list.

8. A computer-readable non-transitory storage medium storing a display control program configured to cause a processor of a display control device including: an application storage configured to store an application; a screen transition rule definition storage configured to store a rule definition of screen transition; and an animation rule definition storage configured to store a rule definition of screen transition animation, to:
arbitrate the screen transition based on the rule definition of the screen transition and generate a screen transition result upon accepting a display request from the application;
receive the screen transition result;
generate screen transition animation information using the received screen transition result;
evaluate an animation constraint expression;
determine whether to execute a screen transition animation in unit of a process of the screen transition;
provide an instruction indicating whether to execute the screen transition animation according to a determination result of whether to execute the screen transition animation; and
control a display of the screen transition animation according to the instruction, wherein
the animation constraint expression is evaluated when the screen transition animation, which is an arbitration target, is in an executing state, and
when the animation constraint expression in the executing state of the arbitration target is determined not to be satisfied during execution of the screen transition animation which is the arbitration target, the screen transition animation, which is the animation target, is added to a cancellation notification animation list.

* * * * *